United States Patent Office 3,631,143
Patented Dec. 28, 1971

3,631,143
METHOD FOR IMPROVING GREEN STRENGTH OF VULCANIZABLE BUTYL RUBBER COMPOUNDS
Alexander J. Rizzer, Akron, Ohio, assignor to Cities Service Company, New York, N.Y.
No Drawing. Filed Jan. 21, 1970, Ser. No. 4,785
Int. Cl. C08g 51/04
U.S. Cl. 260—38                                     2 Claims

ABSTRACT OF THE DISCLOSURE

Green strength of vulcanizable elastomeric compositions which contain carbon black and butyl rubber is improved by the addition of a thermoplastic terpene phenol-formaldehyde Novolak resin containing a trace of free methylol.

BACKGROUND OF THE INVENTION

In the compounding of butyl rubber with carbon black and other ingredients, it is desirable to produce a vulcanizable stock that has sufficient green strength for satisfactory calendering, extrusion, and the like. In the preparation of inner tubes, for example, the green, unvulcanized stock is extruded into a tube which must have sufficient strength to resist tearing and collapsing until vulcanization can be accomplished.

In the past, green strength has been imporated to butyl rubber by adding a promoter such as Polyac®, Elastopar® or GMF® and heating the resultant mixture for an extended length of time. This however, requires additional time and expense in comparison to an operation which required no promotion prior to vulcanization.

SUMMARY OF THE INVENTION

The present invention is based on the discovery that the green strength of vulcanizable elastomeric compositions which contain butyl rubber and carbon black can be considerably improved by the inclusion of a thermoplastic terpene phenol-formaldehyde resin which contains a trace of free methylol. Such resins can be produced by first alkylating phenol with a terpene, e.g. alpha-pinene, and then condensing the terpene phenol with formaldehyde. In the final processing step the resulting resin is vacuum stripped at a temperature above the boiling point of water, allowing a trace of free methylol to remain in the resin, and thus producing a thermoplastic Novolak type of resin as opposed to a heat-hardenable resole type of resin. Resins of this type are commercially available, one example being NTP–90® produced by the Pennsylvania Industrial Chemical Company. NTP–90® has a softening point of about 90° C.

The aforementioned terpene phenolic resins are marketed as tackifiers, plasticizers or extenders for rubber, and as such they would be expected to reduce the green strength of rubber rather than increase it. Most surprisingly, therefore, it has been found that a resin of this type will impart nerve and green strength to butyl rubber which contains carbon black so that compounding and processing of a vulcanizable stock is greatly improved.

While the reaction with the terpene phenol resin which effects the improvement in green strength is not known, it is significant that the reaction is relatively rapid and can be accomplished at conventional mixing times and temperatures in the ordinary fashion for producing a vulcanizable butyl rubber composition, e.g. in a Banbury or Baker-Perkins mixer at temperatures within the range of about 150°–350° F. Accordingly, other desirable compounding ingredients can be mixed with the rubber at the same time, e.g. extenders, vulcanizing agents, antioxidants, zinc oxide, stearic acid, or a portion of rubber pigment or filler other than carbon black, such as silica, calcium silicate or calcium carbonate. After mixing, the vulcanizable composition can then be calendered or extruded in the usual fashion.

The proportion of ingredients in the vulcanizable composition can vary within wide practical limits, being subject to the choice of the formulator. Generally, the proportion of butyl rubber, carbon black and resin will be 100 parts by weight of butyl rubber, from about 40 to about 90 parts by weight of carbon black and from about 5 to about 20 parts by weight of the terpene phenol resin. Any practical and desirable amount and type of extender or plasticizer oil may also be included in the composition. Furthermore, the types and amounts of vulcanizing agents and other ingredients which can be included in the composition is widely variable depending upon the choice of the skilled formulator for producing a high quality vulcanizate suitable for a particular application.

DESCRIPTION OF PREFERRED EMBODIMENT FORMULATIONS

|  | Parts by weight | | |
|---|---|---|---|
|  | 1 | 2 | 3 |
| Bucar 5000NS ® [1] | 100 | 100 | 100 |
| Statex RH ® [2] | 45 | 45 | 45 |
| Flexon 765 ® [3] | 25 | 25 | 25 |
| Zinc oxide | 5 | 5 | 5 |
| Tetrone A ® [4] | 2 | 2 | 2 |
| Altax ® [5] | 0.5 | 0.5 | 0.5 |
| NTP-90 ® [6] |  | 5 | 10 |

[1] Butyl rubber, Columbian Carbon Company.
[2] FEF carbon black, Columbian Carbon Company.
[3] Processing and extender oil, Humble Oil & Refining Co.
[4] Dipentamethylene-thiuram-tetrasulfide, E.I. du Pont de Nemours & Co.
[5] Benzothiozyl disulfide, R.T. Vanderbilt Co.
[6] Terpene phenol resin, Pennsylvania Industrial Chemicals, Co.

*Mix Procedure.*—Mix all ingredients except Tetrone A and Altax on Banbury until carbon is incorporated. Add Tetrone A and Altax on 200° F. roll mill.

TEST RESULTS

|  | 1 | 2 | 3 |
|---|---|---|---|
| Green strength, lbs | 4.07 | 4.59 | 5.92 |
| Mooney viscosity: ML-8' at 212° F | 49 | 46 | 51 |
| Mooney scorch, ML-at 300° F.: 10 point rise (min.) | 8.0 | 8.0 | 7.5 |
| Crescent tear, die B: (60 min. at 307° F. cure) | 230 | 236 | 258 |
| Stress-strain, 30' at 307° F. cure: |  |  |  |
| L-300 modulus | 470 | 290 | 280 |
| Tensile strength | 2,110 | 2,010 | 1,860 |
| Elongation | 790 | 860 | 880 |
| Shore hardness | 46 | 44 | 48 |
| Stress-strain, 60' at 307° F. cure: |  |  |  |
| L-300 modulus | 570 | 350 | 310 |
| Tensile strength | 2,000 | 2,090 | 1,860 |
| Elongation | 700 | 840 | 860 |
| Shore hardness | 45 | 44 | 46 |
| Oven aged 48 hrs. at 302° F.: |  |  |  |
| L-300 modulus | 220 | 180 | 170 |
| Tensile strength | 560 | 450 | 400 |
| Elongation | 700 | 840 | 850 |
| Shore hardness | 37 | 40 | 45 |

Remarks

From the test results it can be seen that the green strength of Compositions 2 and 3, which contained the terpene phenol resin, was greatly improved in relation to Composition 1 which contained no resin. Although the stress-strain properties of Compositions 2 and 3 were somewhat different from Composition 1, they were not adversely affected. To advantage, the tear strength of the composition which contained the resins was significantly improved.

While the invention has been described with reference to particular materials, formulations, conditions and the like, it will be understood that still others can be employed Therefore, what is claimed is:

1. In the compounding of a vulcanized elastomeric composition which contains butyl rubber and carbon black, the method for improving the green strength of the unvulcanized composition which comprises mixing from about 5 to about 20 parts by weight of a thermoplastic alpha-pinene phenol-formaldehyde Novolak resin with said butyl rubber and carbon black prior to processing and vulcanization of said composition.

2. The method of claim 1 wherein said composition contains 100 parts by weight of butyl rubber and from about 30 to about 90 parts by weight of carbon black.

References Cited

UNITED STATES PATENTS

| 2,123,898 | 7/1938 | Honel et al. | 260—51 |
|---|---|---|---|
| 2,230,266 | 2/1941 | Rosenblum | 260—51 |
| 2,308,544 | 1/1943 | Rosenblum | 260—53 |
| 3,294,866 | 12/1966 | Soldatos | 260—41.5 |
| 3,370,023 | 2/1968 | Huang et al. | 260—845 |

LEWIS T. JACOBS, Primary Examiner

U.S. Cl. X.R.

260—41.5 R